June 20, 1967  G. G. RUMBERGER  3,325,968
APPARATUS FOR SEALING CARTONS
Filed Feb. 27, 1964  6 Sheets-Sheet 1

INVENTOR.
George G. Rumberger
BY
Att'y

June 20, 1967  G. G. RUMBERGER  3,325,968
APPARATUS FOR SEALING CARTONS
Filed Feb. 27, 1964  6 Sheets-Sheet 2

Fig. 2

INVENTOR.
George G. Rumberger
BY
[signature] Atty

June 20, 1967  G. G. RUMBERGER  3,325,968
APPARATUS FOR SEALING CARTONS
Filed Feb. 27, 1964  6 Sheets-Sheet 3

INVENTOR.
George G. Rumberger
BY
Frank W. Auescher
Atty.

June 20, 1967   G. G. RUMBERGER   3,325,968
APPARATUS FOR SEALING CARTONS
Filed Feb. 27, 1964   6 Sheets-Sheet 4

INVENTOR.
George G. Rumberger
BY
Frank W. Buescher
Atty.

Fig. 7

INVENTOR.
George G. Rumberger
BY
Grant H. Hueschen
Atty.

June 20, 1967 G. G. RUMBERGER 3,325,968
APPARATUS FOR SEALING CARTONS
Filed Feb. 27, 1964 6 Sheets-Sheet 6

INVENTOR.
George G. Rumberger

United States Patent Office 3,325,968
Patented June 20, 1967

3,325,968
APPARATUS FOR SEALING CARTONS
George Glen Rumberger, Kalamazoo, Mich., assignor, by mesne assignments, to Brown Company, a corporation of Delaware
Filed Feb. 27, 1964, Ser. No. 347,928
7 Claims. (Cl. 53—284)

The present invention relates to a novel method and apparatus for heat sealing cartons, and is more particularly concerned with such a method and apparatus which are particularly adapted for the heat sealing of tubular cartons having a thermoplastic adhesive pre-applied to the flaps thereof.

Cartons having thermoplastic adhesive applied thereto prior to sealing are in widespread use. Among the common adhesives are microcrystalline wax, polyethylene, polyvinyl resins, hot melts, and similar materials, wax compositions being the most widely used adhesive materials. The adhesive is commonly applied as a coating on the surface of the carton. Alternatively, as disclosed and claimed in my copending application Ser. No. 133,439, now Patent No. 3,194,474, the adhesive may be present as the intercalated layer in a laminated sheet material from which the carton is constructed. Additionally, it may be applied in the form of adhesive strips or patches, as disclosed and claimed in my copending application Ser. No. 321,471, filed Nov. 5, 1963, now Patent No. 3,286,906. In some instances the cartons are coated over their entire surfaces on one or both sides, or they may be coated or adhesive applied only in the areas to be sealed.

Cartons of the type described are generally formed by folding and sealing the flaps of a seamed carton blank, commonly referred to as a folded carton. Heat is applied to activate or melt the adhesive, and the carton is sealed by permitting the adhesive to cool while the flaps are maintained in place. It is customary to utilize a mandrel to form the carton by sealing one end. After the contents are introduced into the thus-erected carton, the other end is heat sealed in the same manner but without the use of a mandrel.

When heat is applied to the carton exterior to cause the adhesive to melt, the results are not entirely satsfactory, since the heat must penetrate through two or more thicknesses of the paperboard or other material of which the carton is constructed in order to reach the contiguous surfaces of the underlying flaps. Under these conditions, it is extremely difficult to provide uniform heating at the surfaces desired to be adhered by the thermoplastic adhesive, and the heating process requires an excessively long time since the heat must penetrate through at least a double thickness. Additionally, since the entire carton closure area is exposed to the externally applied heat and absorbs the same, considerable time is required for the carton and closure assembly to cool to a temperature at which the adhesive hardens. The total process thus requires an inordinately long dwell time in the sealing apparatus, since the flaps must also be maintained in position during the cooling period.

It is an object of the present invention to provide a method and apparatus for heat sealing cartons wherein the adhesive-bearing or adhesive-containing carton closure members to be sealed are directly heated. It is a further object to provide such a method and apparatus wherein the adhesive-bearing or adhesive-containing carton closure members may be individually heated. An additional object is to provide such method and apparatus which do not require the use of a mandrel. The accomplishment of the foregoing and additional objects will become more fully apparent hereinafter.

The invention in its preferred embodiment is illustrated by the accompanying drawings in which.

According to the invention, partially erected cartons having their panels connected to form a tube and bearing thermoplastic adhesive means on a surface thereof, e.g., applied directly to an exposed surface, or as a lamination of the carton stock, or in the form of web-supported patches, are sealed by folding in the tuck flaps and extending the outer end flaps in a vertical position coplanar with the walls to which the flaps are attached. The carton in this position is passed over a heating apparatus having slots provided for receiving the extended outer end flaps and having heaters in the walls thereof for heating the surfaces of the flaps which are to be adhered together. The cartons are guided along the apparatus and held square by a transport device as they travel in the slots of the apparatus bed. When they leave the heating slots, they are folded together and permitted to cool in sealed condition. After one end is sealed, the cartons may be filled before or after cooling and the other end sealed in similar manner. In some cases, as where the intermediate flap carries thermoplastic adhesive on its inner surface or is of laminated material with openings into the intercalated laminant adhesive on its inwardly disposed surface, only the single outer flap may be extended vertically, as the intermediate flap will be sufficiently heated even though infolded to adequately seal to underlying flaps.

For sake of convenience, the terminology used to designate the various end flaps throughout the specification and claims has been chosen in relation to the carton structures shown in FIGS. 8–11 of the drawings. For example, the small flaps designated by the numbers 54, 54a, 55 and 55a, which are connected to the smaller panels 52 and 53, are termed "tuck flaps," while the flaps 56, 56a, 57 and 57a, which are connected to the main or larger panels, are designated generally as outer or outer end flaps. Where the two outer flaps are of the same size as the opening in the carton, the outer flap which is first infolded is designated as an intermediate flap and the last infolded flap is designated as the outer end flap. It is of course to be understood that in some constructions, as where the carton has a square cross-section, the tuck flaps may be of a size equal to that of the outer flaps.

As used herein, the term "thermoplastic" is used in its broad sense, that is, denoting a material having the property of softening or fusing when heated, and hardening and again becoming rigid when cool. The term is not used in its special sense as sometimes applied to synthetic resins where it denotes permanently fusible materials, that is, materials which can be re-melted and cooled time after time without undergoing any appreciable change, as distinguished from thermosetting or heat-retractable resins which undergo change upon heating. Whether the sealing material undergoes change or not during the heating and sealing period is immaterial if the heating and cooling involved in the sealing process can be accomplished before the sealing material has undergone sufficient change to render it inoperative. So-called "heat reactable" or thermosetting materials may be used if the adhesive is activated and all of the parts to be adhered placed in position before the adhesive sets.

Reference is now made to the accompanying drawings for a better understanding of the invention, wherein all of the parts are numbered and wherein the same numbers are used to refer to corresponding parts throughout.

Figure 1:
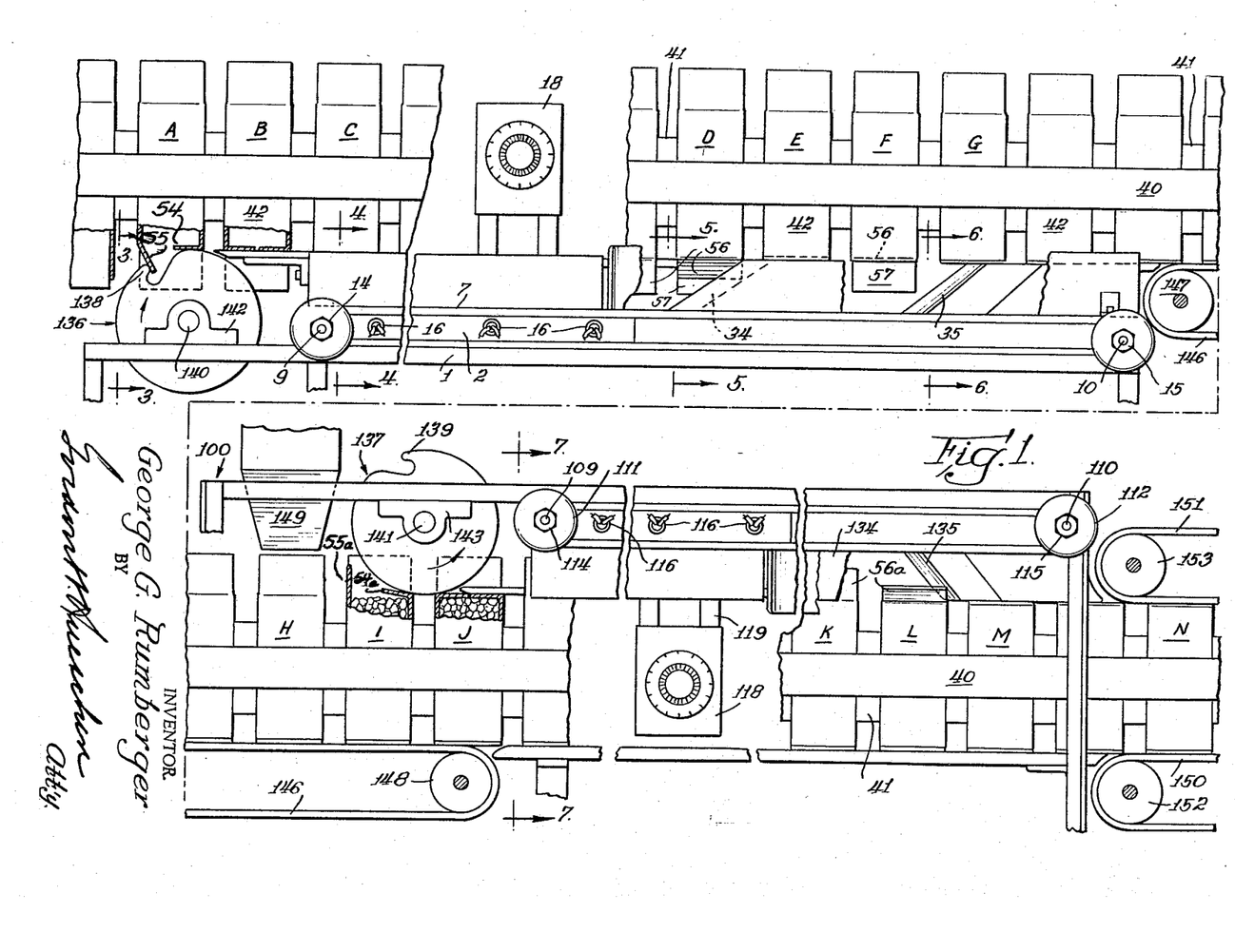
FIG. 1 is a side elevation of a sealing and filling apparatus according to the invention.
Figure 2:
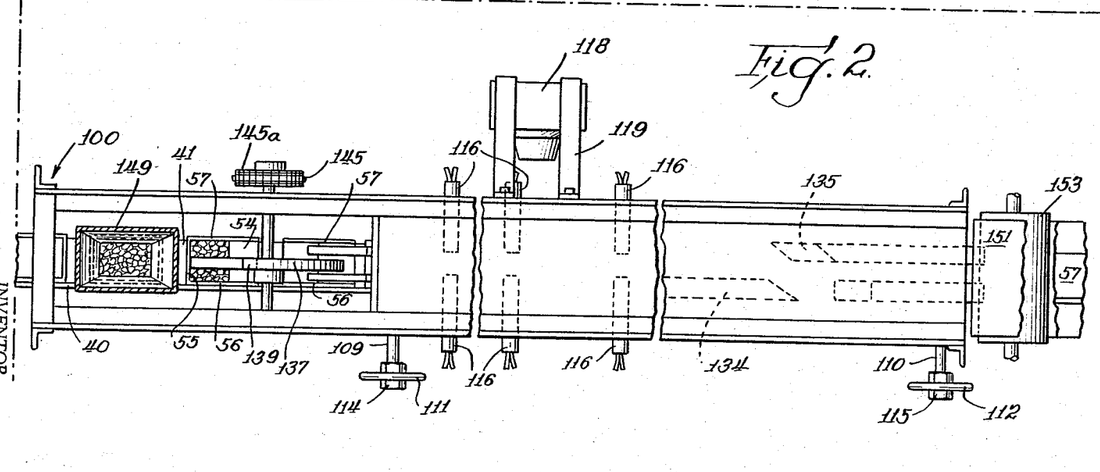
FIG. 2 is a top plan view of the apparatus.
Figure 3:
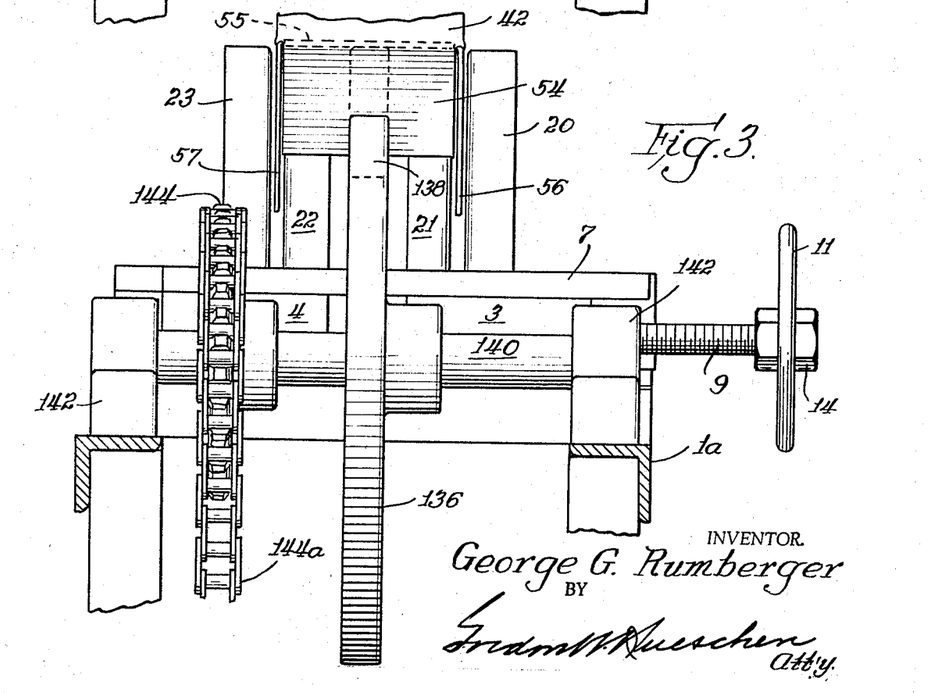
FIG. 3 is an enlarged cross-sectional view taken at the line 3—3 of FIG. 1.

FIGS. 1 and 2 show generally a carton sealing apparatus which, for convenience, may be divided into a bottom sealing station (shown in the upper portion of each figure), a filling station (shown at the lower left-hand portion of each figure), and a top sealing station (shown in the remainder of the lower portion of each figure). The bottom sealing station, shown in greater detail in FIGS. 3–6 comprises a base plate 1 mounted on a frame 1a, shown generally, and a plastic sheet 2 comprised fo a heat-resistant material such as Teflon (polytetrafluoroethylene). The plastic sheet is used to permit a portion of the sealing apparatus to slide thereover for adjustment and to provide thermal insulation. Mounted on the plastic sheet are a pair of longitudinal heater bars 3 and 4 having lateral strips 5 and 6 affixed thereto, respectively. Transverse guide bars 7 are affixed to the ends of the heater bar 4 by means of screws. The heater bar 4, the transverse guide bars 7, and the lateral strip 6 are affixed together as a unit which is slidable over the plastic sheet 2. Adjustment is provided by means of adjustment screws 9 and 10 each having an adjustment wheel 11 and 12 affixed to the end thereof by nuts 14 and 15 for manual adjustment of the spacing between the heater bars.

A plurality of electrical heater cartridges 16 are positioned in cavities provided at intervals along the longitudinal heater bars 3 and 4. Thermostatic sensor elements, not shown, are positioned in the heater bars 3 and 4 for controlling the temperature. A heat control unit 18 is affixed to the base plate 1 by means of brackets 19 and actuated by the sensor elements to provide means for controlling the current applied to the heater cartridges.

Vertical heater plates 20, 21, 22 and 23 are affixed to the heater bars 3 and 4 as by means of screws 25. The heater plates 20 and 21 and the heater plates 22 and 23 are spaced apart a distance sufficient to permit the outer end flaps of a carton to pass therebetween. A horizontal heater plate 26 is affixed to the vertical heater plates 21 and 22 by means of screws 27. Plates 26 of different widths may be utilized to accommodate cartons of various sizes. The purpose of the heater plate 26 is to support the bottom of the carton and to heat the tuck or inner end flaps, and also the intermediate flap when infolded. so that the sealing process is facilitated by having all of the carton flaps to be sealed at approximately the same temperature range. Alternatively, separate strips may be utilized in place of plate 26, one strip affixed permanently to each of the heater plates 21 and 22. Adjustments may then be made for various size cartons without changing the strips or plates. However, with such arrangement only a limited area of each tuck flap will be heated directly.

After a carton leaves the area in which the bottom flaps are heated, it enters an area wherein the flaps are infolded. This portion of the apparatus comprises guide fences 30 and 31 affixed to supports 32 and 33. Folding blocks 34 and 35 are provided to infold, over the already folded tuck flaps, first the heated outer flap, or intermediate flap, on one side, and then the heated outer end flap on the other side, where they are maintained in position by horizontal strips 36 and 37 while the thermoplastic adhesive cools and sets.

The heating and sealing portion of the top sealing station is almost identical to that of the bottom sealing station described except that it is inverted. This portion of the apparatus is supported by a suitable frame 100, shown generally, and comprises a base plate 101, and a Teflon sheet 102. Longitudinal heater bars 103 and 104 having lateral strips 105 and 106 are adjustably mounted to the base plate 101 by suitable means such as bolts. Adjustment control is provided by adjustment screws 109 and 110 to which adjustment wheels 111 and 112 are affixed by means of nuts 114 and 115. Heater cartridges 116 are positioned in cavities provided at intervals along the heater bars 103 and 104. The temperature of the heating apparatus is controlled by a heat control unit 118 affixed to the base plate 101 by means of brackets 119 cooperating with a thermostatic sensor element, not shown.

Vertical heater plates 120, 121, 122 and 123 are affixed to the heater bars 103 and 104 by suitable means such as screws. A horizontal heater plate 126 is affixed to the vertical heater plates 121 and 122 by suitable means such as screws, and serves to heat the top tuck flaps of the carton, and also the intermediate flap when it is infolded. The bottom of the carton is supported by means of a base plate 127 mounted on brackets 128.

After the carton leaves the heating plate zone, the flaps are folded in by folding blocks 134 and 135, shown in FIGS. 1 and 2. The tuck flaps are folded in by means of rotating hook-wheels 136 and 137. The hook-wheels have peripheral hooks 138 and 139, and are affixed to shafts 140 and 141 journaled through suitable bearings 142 and 143 mounted on the frame of the apparatus. Sprockets 144 and 145 are affixed to the shafts 140 and 141 and are in turn driven by chains 144a and 145a. Other suitable drive means may of course be utilized, although chain drives aid in maintaining synchronization of the hook-wheels. Alternatively, plows, shuttles, or other devices known in the art may be used to fold the tuck flaps.

The conveyor or transport system, shown in FIG. 1, comprises an endless belt 40 having affixed thereto a plurality of rectangular forms 41. The forms 41 serve to space the cartons 42 at proper intervals. Moreover, by providing a tight fit between forms, the cartons may be gripped between two forms and maintained in proper orientation throughout the sealing process. When the conveyor system reaches an end of the system, the structure may conventionally be so arranged that the belt is guided around a wheel in order to return to its starting position. As the belt makes the turn, the spacing between forms is augmented radially. This enables the cartons to be easily loaded or discharged at the turning points of the conveyor system. Replaceable forms of various sizes may be utilized to accommodate different size cartons, or the forms may be split and adjusted to accommodate various widths.

The method and apparatus of the present invention are particularly useful for sealing of recently developed cartons constructed of laminated sheet materials in which the laminant is a thermoplastic adhesive which is present within the sheet material as an intercalated layer thereof, as disclosed and claimed in copending application Ser. No. 133,439, entitled, "Heat-Sealing Cartons."

Figure 8:
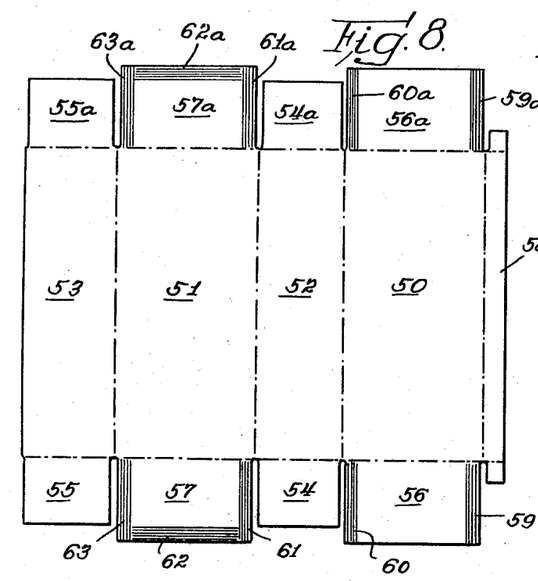
FIG. 8 is a plan view of a blank cut and scored for the production of a carton suitable for being filled and sealed on the apparatus of the present invention.

The laminated sheet material is utilized to provide cut and scored carton blanks, such as that of FIG. 8, from which cartons may be formed. Selected and flaps of the blanks may be provided with openings, e.g., slits, cuts, or foramen, from the outer surface of at least one ply of the laminated sheet material into the intercalated thermoplastic laminant adhesive, as in heat-sealing areas where the surface of the end flap is to lie in opposed facing relationship with the surface of another flap to which it is to be secured. Alternatively, perforations extending entirely through such a closure flap, from face to face and through all plys thereof, may be used, especially where both surfaces of such closure flap are to lie in opposed facing relationship with other carton surfaces, as with an intermediate end flap. Excellent carton seals are attained upon activation of the thermoplastic adhesive laminant indigenous to the carton construction in said heat-sealing areas thereof to cause extrusion of the said adhesive through the said ply openings, and setting of the adhesive by allowing the same to congeal, thereby providing bodies of solidified adhesive integrally bonding the various flaps of the carton construction together in the said heat-sealing areas. Carton blanks and cartons prepared in this manner are of special interest with relation to the provision of leak-proof and hermetically sealed cartons or carton-like containers and the hermetic closure thereof, all of which is accomplished by extrusion of the thermoplastic laminant adhesive in the molten or semi-molten state through the ply openings provided in the flap heat-sealing areas, as well as from cut edges of the heat-sealed flaps. Alternatively, the heat-sealing cartons may be constructed of standard carton stock. After the blank has been formed, adhesive patches may be affixed to areas of the flaps which are to be sealed. As disclosed in my copending application, Ser. No. 321,471, the patches comprise a web of a material such as paper or paper board, an adhesive such as glue on one surface of the web, and a thermoplastic adhesive on the other. Alternatively, the patches may be provided in the form of two layers of paper or paperboard stock having an intercalated layer of thermoplastic adhesive. The outer surface of one of the webs is provided with an adhesive for affixing to the carton flap, and the other web is provided with openings such as slits or perforations to provide a means for the intercalated layer of adhesive to be extruded to the surface of the web. After the patches have been applied to the flaps, the carton may be subjected to the present process by extending at least one and preferably both of the outer flaps vertically and passing them between vertical heating plates. The cartons are filled and sealed in the same manner as described above for the cartons formed from laminated stock.

In an additional embodiment, a coating of a thermoplastic adhesive may be applied directly to the flaps. Subsequently, when the flaps are extended and passed through the heating chambers between the vertical plates, the adhesive is activated and the carton sealed in a manner similar to that described above. Guards in the heating slots to prevent a substantial amount of the thermoplastic adhesive from sticking to the heating plates are not required, since the flaps are vertically extended, and any adhesive which may drip therefrom will not impede progress of the carton through the heating slots or subsequent stages of the closing and filling procedure.

Laminated sheet materials, when employed in the carton construction, will ordinarily contain at least about fifty-five pounds and preferably greater amounts of thermoplastic adhesive laminant per standard 24 inches by 36 inches by 500 sheet (3000 square feet) ream of the laminated sheet material. This permits unprecedented sealing characteristics. In addition, the base plies of the laminated sheet material will ordinarily have a porosity of at least five and preferably ten seconds. This permits the desired extrusion and allows scoring and provision of necessary openings without fragmentation. The laminated sheets will ordinarily also have a porosity, as defined by the air resistance test of TAPPI method T460 m–49, of at least five seconds and preferably ten seconds or above. The thinnest paper sheets of the laminated sheet material will also ordinarily, for adequate strength, have a Mullen dry burst strength of ten or above, and preferably fifteen or more, as determined by TAPPI procedure T403. However, strength may not be critical, and is generally not as critical as porosity, especially when stretchable materials such as creped papers, or when plastic films such as polyethylene or polyvinyl chloride films are used as the thinnest sheet of the laminate.

When laminates are employed as the material of the carton construction, the requisite openings, interstices or apertures in one or more plies of the carton flap or flaps may be and preferably are slits or cuts, and their disposition may be either longitudinal, transverse, or diagonal. When present in more than one carton flap, or when upon folding of the carton the slits or cuts in a ply of one flap oppose the slits or cuts in an opposing ply of another carton flap, they may be the same or different, in any combination of longitudinal, transverse, or diagonal disposition, including diagonal slits in the ply of one flap and reverse diagonal slits or cuts in the ply of the other flap, e.g., an underlying flap member. The slits or cuts may be of the aforesaid types, whether only one, or more than one, ply of one or more than one carton flap is slit or cut, and whether or not the said slit or cut plies are opposed and in contact with each other upon folding of the carton flaps. When "perforations" are present, said term being understood to indicate openings which go through the entire sheet material from one surface thereof to the other, i.e., through all plies of the sheet material, such perforations may be slit, cut, punched, square, rectangular, circular, oval, triangular, diamond-shaped, dog-eared, elliptical, or of any other type or shape and, when slits or cuts or rectangles or the like, may be longitudinal, transverse, diagonal, any combination thereof, or of any other direction or configuration, and may be imparted to the carton flap with or without removal of a part of the sheet material of construction as by drilling or punching. If openings in only one ply of sheet material are present, these may be in shapes and sizes other than slits or cuts, and may be of any configuration or type mentioned for perforations, but are preferably slits or cuts, usually at least one-sixteenth inch apart or approximately twelve to the inch, and at any rate ordinarily no less than two leads (.056 inch) apart In addition, any carton flap, but preferably an intermediate flap, may be provided with a combination of openings (such as slits, or cuts, or circular cutouts, or the like) in one ply of the flap and also perforations entirely through the same flap, or the flap may be provided with openings such as aforesaid in both outer plies thereof, with or without removing laminant or other material of construction, or any other combination of openings and/or perforations may be employed on either or both surfaces of a single flap. Whether the openings are present in only one ply or in more than one ply, and whether in the form of perforations, slits, cuts, or the like, the openings are ordinarily at least $\frac{1}{32}$ and usually at least $\frac{1}{16}$ of an inch in at least one dimension, and in any event have dimensions greatly exceeding the dimensions of the pore openings normally present in the fibrous sheet materials employed in the laminate.

It is preferable to provide the necessary openings or foramen, usually in the form of slits or perforations, for the extrusion of the laminating adhesive, when used in the construction of the heat sealing cartons, at some stage after the laminating step, and during or after the formation of scores and cutouts necessary for the delineation of the carton structure, and preferably after the printing of any required indicia, or art work which must be registered with the carton faces. In this way the means for extrusion of the laminating adhesive are located in exactly the desired zones as required for the formation of the desired bond or seal, and laminant adhesive is not randomly extruded as would be the case if openings were placed in one or both of the sheet materials in advance of the laminating step. Further, due to the character of the slits or perforations provided and the amount of adhesive used as laminant, they should be provided following the lamination step, as this prevents unwanted transfer of the molten hot melt used in the laminating step through the sheet prior to the moment of its intended use in sealing of the carton.

Inasmuch as the functioning of the sealing and laminating adhesive of the laminated carton structure does not depend on the principle of differential migration by absorption, but rather on extrusion under heat or heat and pressure, the choice of sheet materials which can be used is quite broad, as they can be of equal or differing calibers and and porosities. In general, it is preferred that a lighter sheet be used for the inside ply of the laminated sheet material, although for some applications the heavier sheet may form the inside surface of the carton wall. When the heavier sheet is placed on the side which will become the outside surface of the carton, it will generally be a pigment coated paper or paperboard to provide a good printing surface, and to obtain other advantages which will be hereinafter described. At least one sheet of the laminated sheet material must have sufficient strength to provide structural rigidity, and ordinarily both sheets will have sufficient strength for this purpose and will each exceed about ten pounds per inch in tensile strength as determined by TAPPI method T404m. In some cases, the tensile strength of one or both sheets will be much higher when required for specific packaging applications. The thickness of the sheet materials employed in the laminated sheet material will generally range from about .002 to about .016 inch, with a thickness of laminant from about .004 inch to about .015 inch but usually ranging from about .004 to about .008 inch. While the thickness of the sheet materials as mentioned is usually from about .002 to .016 inch, paperboard sheet material may be employed as one ply of the laminated sheet which has a thickness as great as .03 inch.

Any or all sheet materials used as base sheet material stocks for production of the starting laminated sheet material may be treated in any of various ways, such as by printing, treating for grease-proofness or wax holdout, glossing, and the like, and such treatment will ordinarily be applied prior to lamination. Representative sheet materials include, in addition to paper and paperboard, parchment papers, papers containing foil mounted thereon, grease-proof papers, glassine papers, non-woven fabrics, and the like.

As further indicative of base material stocks which are suitable for incorporation into laminated sheets for scoring and cutting into carton blanks and erecting into cartons according to the method and with the apparatus of the present invention, there may be mentioned the usual paper or paperboard sheets, such as made on a cylinder machine or a multiple-headbox Fourdrinier machine, having a number of plies, or heavy paper sheets having only a single ply. Generally speaking, the base sheet stock may be any fibrous cellulosic or synthetic sheet, but in some cases may include foils or films as one ply thereof. Aluminum foil may sometimes advantageously be used for one ply, especially when the ply is to become the inside surface of a carton. In such cases the aluminum foil may be and preferably is mounted on a light paper before gluing or laminating to a second fibrous ply, foil side in. For highest possible moisture-vapor proofness, these sheet stocks may be additionally proofed, including, for example, dry waxed, semi-waxed, or surface waxed paperboard or paper materials, or polyethylene-coated materials or the like. The cartons may be fabricated of such laminated sheet materials illustratively paperboard wax-laminated to paper and will in general be fibrous sheets laminated to each other or to foils with suitable laminating materials as hereinafter more fully described.

As thermoplastic adhesive laminant for uniting the plies of laminated sheet materials which are employed in producing the heat-sealable laminated cartons or the laminated heat-sealing patches or otherwise the so-called hot-melt adhesives are preferred. Moisture-vapor proof hot melts based on petroleum waxes are especially suitable as these have a high degree of plasticity and flexibility. Hot melts based on microcrystalline waxes are especially preferred. Additional representative laminant adhesives include (A) microcrystalline waxes of any origin e.g., Louisiana, Pennsylvania, Mid-Continent, or European origin, and/or paraffin waxes modified with: (1) synthetic polymers such as butyl rubber, polyisobutylene, polyethylene, copolymers of vinyl acetate and ethylene, (2) aluminum stearate, (3) hydrophilic adsorbents, (4) surface activators, (5) terpene resins, (6) ester gums, (7) rosin derivatives, and the like; (B) low molecular weight polymers such as (1) polystyrene of 4,000 to 20,000 M.W., (2) polyethylene of 2,000 to 12,000 M.W., (3) polyterpenes, (4) isoprene polymers, (5) chlorinated natural and synthetic rubbers, (6) natural rubbers, and the like; (C) cellulose derivatives such as (1) ethyl cellulose compositions and mixtures thereof with resins, waxes and plasticizers, (2) nitrocellulose thermoplastics, (3) cellulose acetates or other esters and mixtures thereof with resins and the like; all of which may be suitably modified with various other resins and with plasticizers, according to conventional knowledge and procedure of the art.

In FIG. 8 is shown a blank suitably cut and scored which may be seamed and erected into a carton and sealed by means of the apparatus described. The blank comprises face or main panels 50 and 51, end panels 52 and 53, tuck flaps 54 and 55 and 54a and 55a, intermediate flaps 56 and 56a and outer end flaps 57 and 57a. A glue flap 58 is hingedly connected to one of the panels, as for example, panel 50. The glue flap 58 is provided to be affixed to the panel at the opposite end of the blank, end panel 53, to form a tube, which first step is usually carried out by the carton manufacturer. The blank may be cut from laminated stock of the type described above, and may comprise two sheets of paperboard having an intercalated layer of a thermoplastic adhesive such as microcrystalline wax. Groups of parallel slits 59, 60, 61, 62, and 63, and 59a, 60a, 61a, 62a, and 63a are provided at edges of the intermediate flaps 56 and 56a and the edges and ends of the outer flaps 57 and 57a through which the thermoplastic adhesive may be extruded to the surfaces of the flaps when heated.

Figure 9:
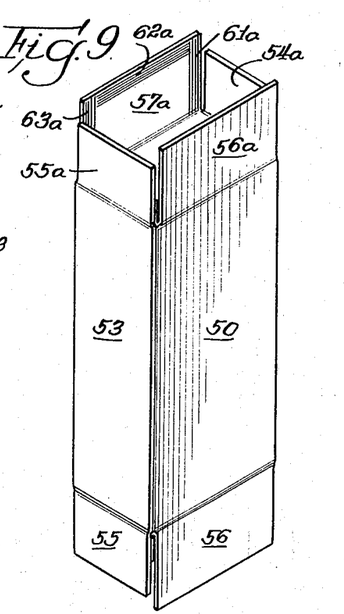
FIG. 9 is an isometric view of a partially erected carton formed from the blank of FIG. 8.
Figure 10:
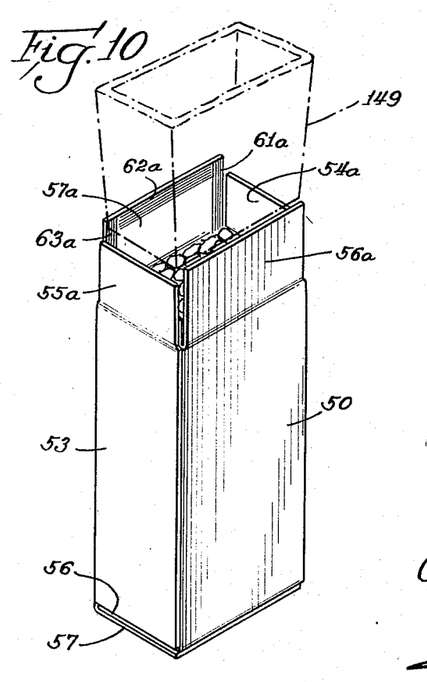
FIG. 10 is an isometric view of the carton of FIG. 9 after one end has been sealed and the carton has been filled.
Figure 11:
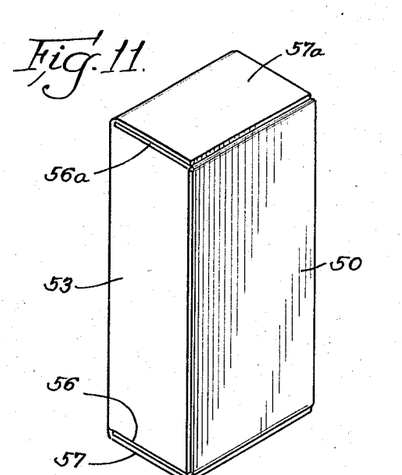
FIG. 11 is an isometric view of the completely filled and sealed carton of FIG. 10.

FIGS. 9–11 show several steps in the erection, filling and sealing of a carton. To prepare the cut and scored blank for insertion into the present apparatus, the glue flap 58 is first glued to the edge panel 53 to form a tubular structure as shown in FIG. 9. The tubular structure is then placed between two forms 41 of the conveying apparatus shown in FIG. 1 with flaps extended. As the carton reaches the hook-wheel 136, the first truck flap 54 is engaged by the hook-wheel and folded back. As the carton advances, the hook-wheel rotates and engages the rear tuck flap 55 from behind and pushes it forward into closed position. FIG. 1 illustrates the various stages in the complete erection, filling, and sealing of the cartons, indicated at positions A–N. As shown at position A, one tuck flap 54 has been folded in and the rear tuck flap 55 is in the process of being folded in.

Figure 4:
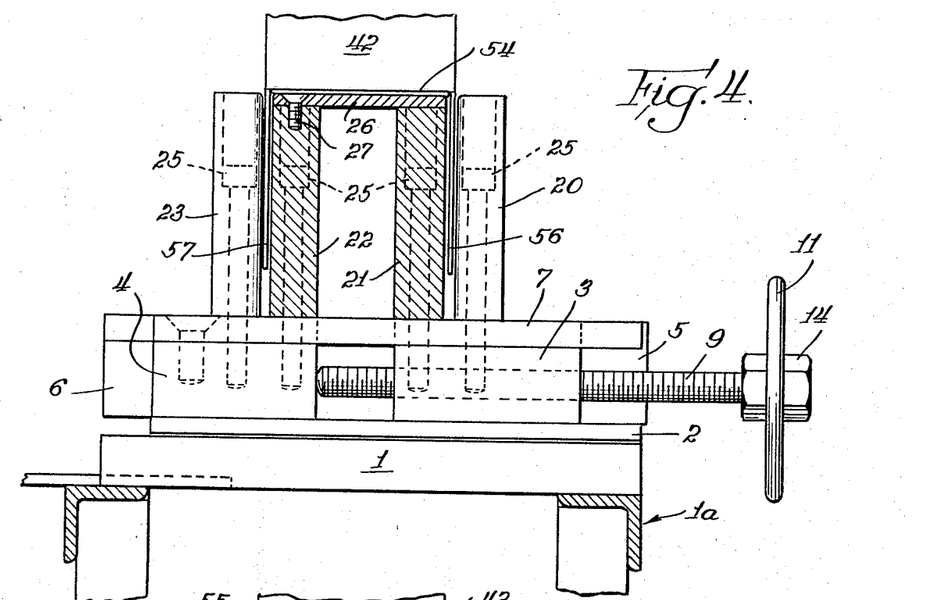
FIG. 4 is an enlarged cross-sectional view taken at the line 4—4 of FIG. 1.
Figure 5:
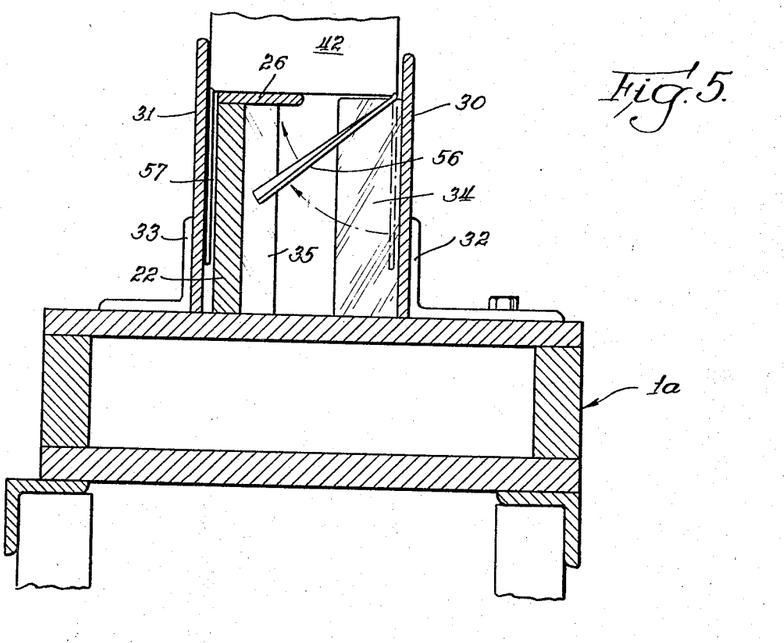
FIG. 5 is an enlarged cross-sectional view taken at the line 5—5 of FIG. 1.
Figure 6:
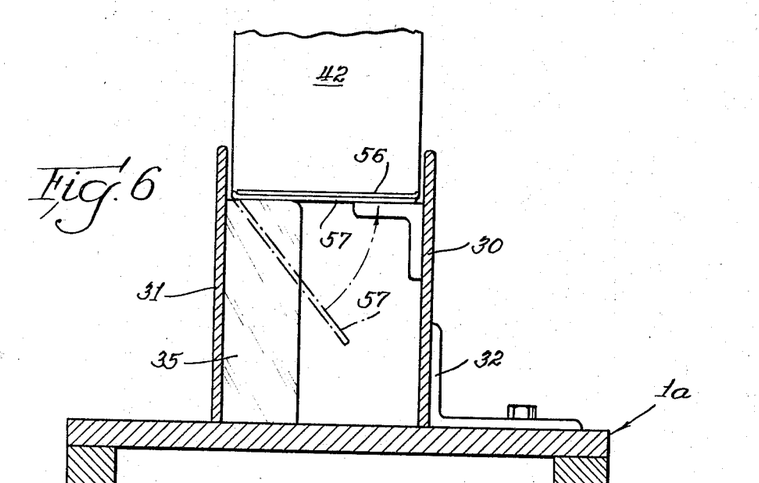
FIG. 6 is an enlarged cross-sectional view taken at the line 6—6 of FIG. 1.
Figure 7:
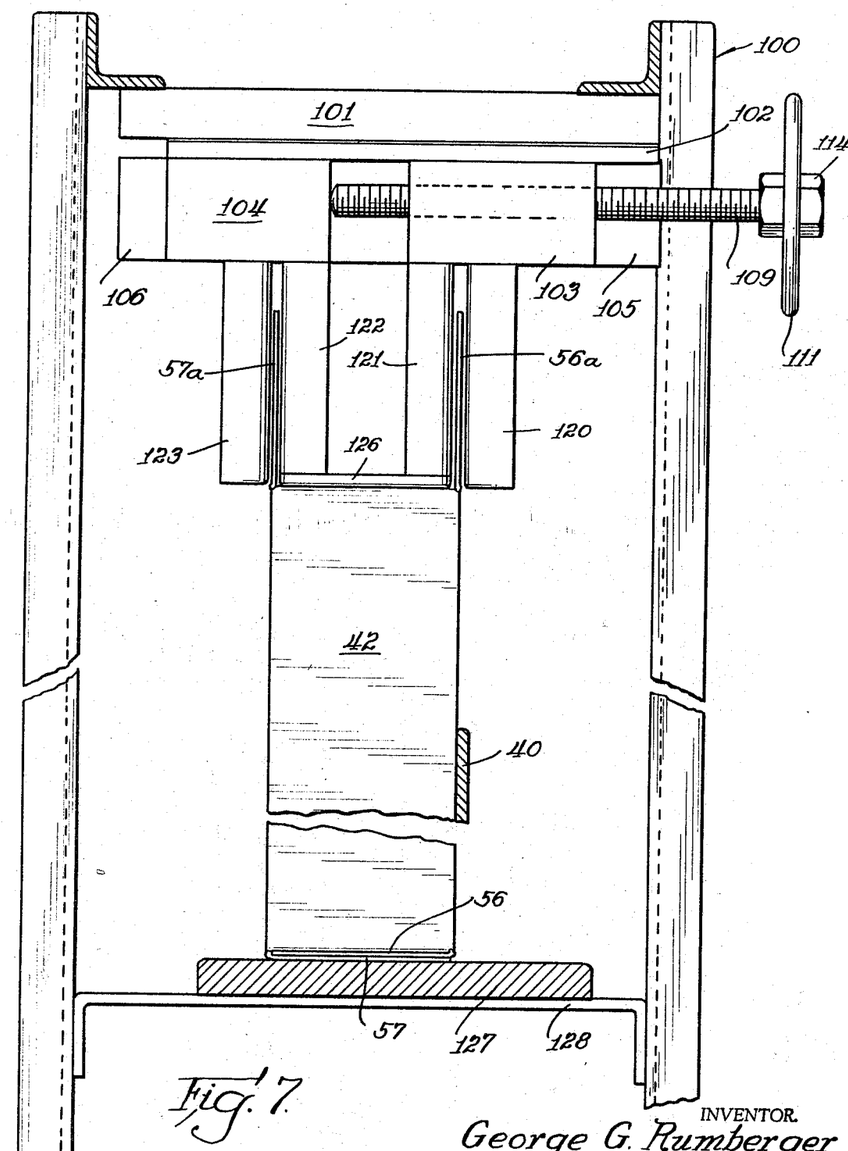
FIG. 7 is an enlarged cross-sectional view taken at the line 7—7 of FIG. 1.

At position B both tuck flaps are folded in. The carton enters the heating zone at position C, in which position the flaps 56 and 57 (intermediate and outer flaps) are in the spaces between the vertical heater plates, as shown in FIG. 4. The carton with the flaps heated emerges at position D where flap 56 encounters the folding block 34 and is folded in place at position E. At position F, flap 57 encounters the folding block 35 and is folded in place at position G. The bottom of the carton then encounters a moving cooling belt 146 mounted on drums 147 and 148, suitably driven, where the adhesive binding the flaps together is cooled. The separate belt and drum assembly 146, 147 and 148 may be eliminated if desired and both ends subsequently simultaneously cooled after the carton has been filled at the top flaps heated and closed.

At position H the carton is filled by a filling nozzle 149 or other suitable means.

At position I the forward tuck flap 54a has been folded in, and at position J both tuck flaps 54a and 55a have been folded in. The main upper flaps 56a and 57a, or intermediate and outer flap, then pass through the upper heating zone in the space provided between the vertical heater plates. At position K the carton emerges, and the folding block 134 folds flap 56a down. At position L the folding block 135 is encountered and the other flap 57a is folded down at position M. The carton then enters a hold-down or cooling zone N between two moving belts, 150 and 151 mounted on drums 152 and 153 having cooling means, where the adhesive is quickly cooled while the belts apply a continuous force against the flaps to hold them in position.

One of the most important advantages of the present apparatus and method is that the carton may be sealed at its bottom, filled, and sealed at the top without the need for turning it over. A further advantage is that by utilizing heaters oriented to heat the flaps while they are extended vertically, no appreciable restraining force is required to hold the flaps in an unnatural position, e.g., other than coplanar with the carton panel to which they are articulated. Consequently, the flaps may contact the heating walls only very lightly if at all. When the flaps are heated by devices which at the same time apply force to restrain the flaps in horizontal position as by means of heated rollers, or by any other device which requires that they be horizontally extended, there is always the disadvantage that the adhesive will be wiped off and lost or the carton delaminated due to the sealing operation.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. A filling and sealing apparatus for cartons provided in the form of a tube having open outer end flaps at each end containing a thermoplastic adhesive which comprises:
  (A) means for conveying said cartons in upright position;
  (B) a bottom sealing station comprising
    (1) a heating means having vertically oriented slots adapted to receive and heat the outer end flaps at the bottom of said cartons while they are maintained in downwardly extended position,
    (2) means for folding said outer end flaps into closed position;
  (C) a loading station having means for filling said cartons; and
  (D) a top sealing station comprising
    (1) heating means having vertically oriented slots adapted to receive and heat the outer end flaps at the top of said cartons while they are maintained in upwardly extended position,
    (2) means for folding said outer end flaps into closed position, and
    (3) means for retaining said flaps in contiguous relationship until said adhesive sets.

2. A filling and sealing apparatus for cartons provided in the form of a tube having open end flaps at each end containing a thermoplastic adhesive which comprises:
  (A) means for conveying said cartons in upright position;
  (B) a bottom sealing station comprising
    (1) heating means defining at least one vertically oriented slot adapted to receive and heat one of said end flaps at the bottom of said cartons while it is maintained in downwardly extended position,
    (2) means for folding said end flaps into closed position, and
    (3) means for maintaining said flaps in contiguous relationship until said adhesive sets;
  (C) a loading station having means for filling said cartons; and
  (D) a top sealing station comprising
    (1) heating means defining at least one vertically oriented slot adapted to receive and heat at least one of said end flaps at the top of said cartons while it is maintained in upwardly extended position,
    (2) means for folding said end flaps into closed position, and
    (3) means for retaining said flaps in contiguous relationship until said adhesive sets.

3. A filling and sealing apparatus for cartons provided in the form of a tube open at both ends and having outer end flaps and tuck flaps at each end containing a thermoplastic adhesive which comprises:
  (A) means for conveying said cartons in upright position;
  (B) a bottom sealing station comprising
    (1) means for folding the bottom tuck flaps into closed position,
    (2) heating means defining a pair of vertically oriented slots adapted to receive and heat said downwardly extended outer end flaps while they are maintained in downwardly extended position, and defining a horizontally oriented surface adapted to heat said folded tuck flaps,
    (3) means for folding said extended outer end flaps into closed position;
  (C) a loading station having means for filling said cartons; and
  (D) a top sealing station comprising
    (1) means for folding the top tuck flaps into closed position,
    (2) heating means defining a pair of vertically oriented slots adapted to receive and heat said upwardly extended outer end flaps while they are maintained in upwardly extended position, and defining a horizontally oriented surface adapted to heat said folded tuck flaps,
    (3) means for folding said extended outer end flaps into closed position, and
    (4) means for retaining the flaps of both the top and bottom of said cartons in contiguous relationship until said adhesive sets.

4. A filling and sealing apparatus for cartons provided in the form of a tube having open end flaps at each end containing a thermoplastic adhesive which comprises:
  (A) means for conveying said cartons in upright position;
  (B) a bottom sealing station comprising
    (1) means for arranging at least one of said end flaps at the bottom of said cartons in a downwardly extended position and means for folding the remainder of said flaps into closed position,
    (2) heating means defining at least one vertically oriented slot adapted to receive and heat said downwardly extended end flap while it is maintained in downwardly extended position, and defining a horizontally oriented surface adapted to heat said folded end flaps,
    (3) means for folding said extended end flap into closed position, and
    (4) means for maintaining said flaps in contiguous relationship while said adhesive sets;
  (C) a loading station having means for filling said cartons; and (D) a top sealing station comprising
  (1) means for arranging at least one of said end flaps at the top of said cartons into an upwardly extended position and means for folding the remainder of said flaps into closed position,
  (2) heating means defining at least one vertically oriented slot adapted to receive and heat said upwardly extended end flap while it is maintained in upwardly extended position, and defining a horizontally oriented surface adapted to heat said folded end flaps,
  (3) means for folding said extended end flap into closed position, and
  (4) means for retaining said flaps in contiguous relationship until said adhesive sets.

5. A filling and sealing apparatus for cartons provided in the form of a tube open at both ends and having outer end flaps and tuck flaps at each end containing a thermoplastic adhesive which comprises:
  (A) means for conveying said cartons in upright position;
  (B) a bottom sealing station comprising
    (1) means for folding the bottom tuck flaps to closed position,
    (2) heating means having vertically oriented slots adapted to receive and heat the outer end flaps at the bottom of said cartons while they are maintained in downwardly extended position and a horizontally oriented heating surface to engage and heat said infolded tuck flaps,
    (3) means for folding said outer end flaps into closed position, and
    (4) means for maintaining said flaps in contiguous relationship while said adhesive sets;
  (C) a loading station having means for filling said cartons; and
  (D) a top sealing station comprising
    (1) means for folding the top tuck flaps into closed position,
    (2) heating means provided with vertical slots adapted to receive and heat the outer end flaps at the top of said cartons while they are maintained in upwardly extended position, and a horizontally oriented heating surface to engage and heat said infolded top tuck flaps,
    (3) means for folding said outer end flaps into closed position, and
    (4) means for retaining said flaps in contiguous relationship until said adhesive sets.

6. A filling and sealing apparatus according to claim 3 having means for adjusting the spacing between the vertically oriented slots of the heating means of both said bottom sealing station and said top sealing station, and wherein the horizontally oriented heating surfaces of both said bottom sealing station and said top sealing station are replaceable with other heating surfaces having dimensions designed to accommodate the adjusted spacings of said vertically oriented slots.

7. A filling and sealing apparatus for cartons provided in the form of a tube having open outer end flaps at each end containing a thermoplastic adhesive which comprises:
  (A) means for conveying said cartons in upright position;
  (B) a bottom sealing station comprising
    (1) heating means defining vertically oriented slots adapted to receive and heat the outer end flaps at the bottom of said cartons while they are maintained in downwardly extended position and means for adjusting the spacing between said slots,
    (2) means for folding said outer end flaps into closed position;
  (C) a loading station having means for filling said cartons; and
  (D) a top sealing station comprising
    (1) heating means defining vertically oriented slots adapted to receive and heat the outer end flaps at the top of said cartons while they are maintained in upwardly extended position and means for adjusting the spacing between said slots,
    (2) means for folding said outer end flaps into closed position, and
    (3) means for retaining said flaps in contiguous relationship until said adhesive sets.

References Cited

UNITED STATES PATENTS

| | | | |
|---|---|---|---|
| 2,160,008 | 5/1939 | Van Buren | 53—47 X |
| 2,903,833 | 9/1959 | Jones | 53—375 |
| 3,020,691 | 2/1962 | Oxborrow | 53—376 |

TRAVIS S. McGEHEE, *Primary Examiner.*